T. H. BANKS.
VEHICLE TIRE.
APPLICATION FILED AUG. 16, 1907.
943,173.
Patented Dec. 14, 1909.
2 SHEETS—SHEET 1.
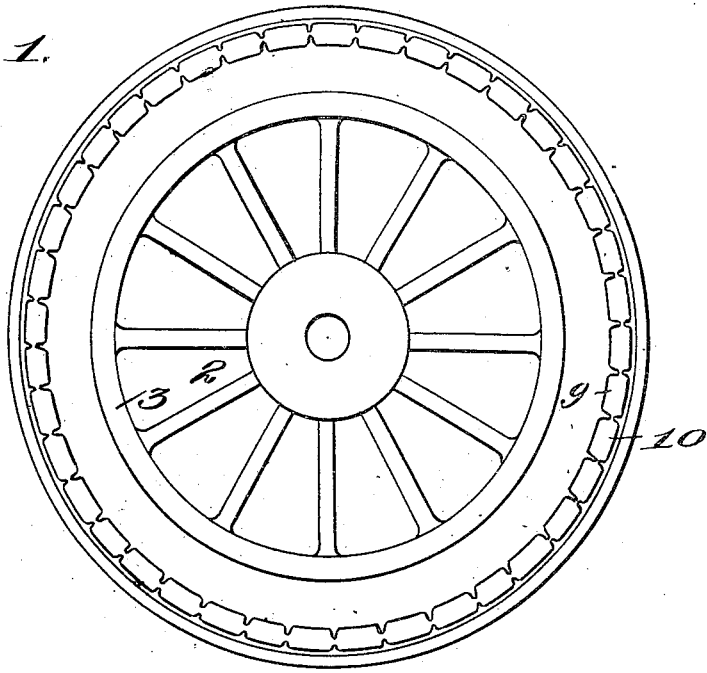
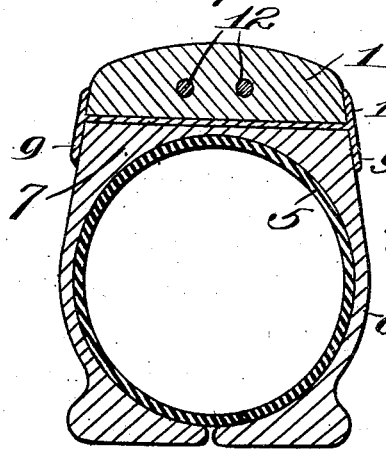
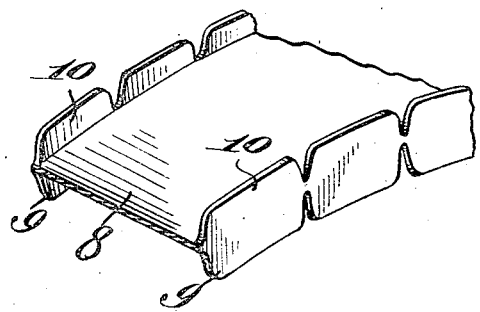
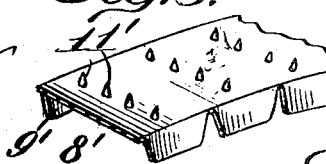
Witnesses:
Inventor
Theodore H. Banks
By James L. Norris
Atty

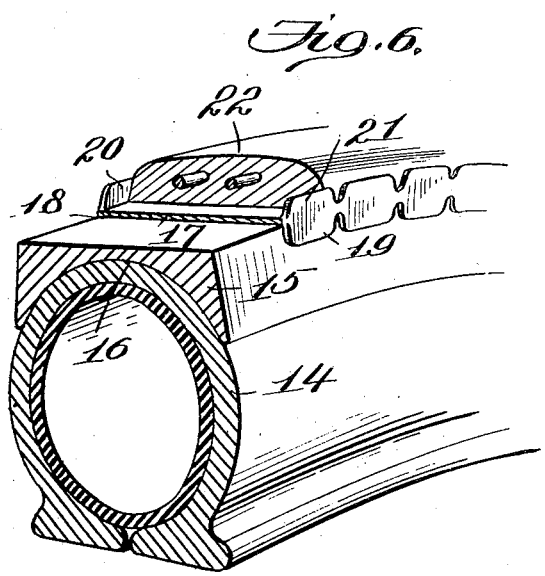
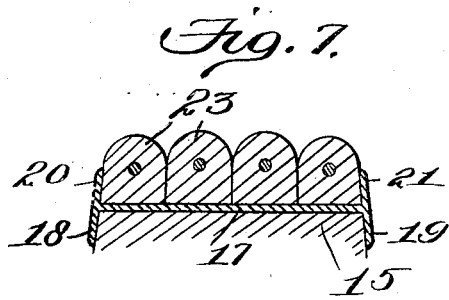

UNITED STATES PATENT OFFICE.

THEODORE H. BANKS, OF SAN ANTONIO, TEXAS.

VEHICLE-TIRE.

943,173.

Specification of Letters Patent. Patented Dec. 14, 1909.

Application filed August 16, 1907. Serial No. 388,895.

*To all whom it may concern:*

Be it known that I, THEODORE H. BANKS, a citizen of the United States, residing at San Antonio, in the county of Bexar and State of Texas, have invented new and useful Improvements in Vehicle-Tires, of which the following is a specification.

This invention relates to vehicle tires.

While my invention may be incorporated with advantage in tires of different classes, it is of especial utility when employed in connection with a tire involving an inflatable tube and which is used principally on automobiles, the invention being of such character as primarily to prevent puncturing of such tube.

In the drawings accompanying and forming a part of this specification I have illustrated in detail certain forms of embodiment of the invention which, to enable those skilled in the art to practice the same, will be set forth fully in the following description, while the novelty of said invention will be included in the claims succeeding said description.

Referring to said drawings: Figure 1 is a side elevation of a vehicle wheel provided with a tire embodying my invention. Fig. 2 is a cross sectional view of the tire. Fig. 3 is a detail view in perspective of portion of a shoe. Fig. 4 is a longitudinal sectional view of the same, and Fig. 5 is a view corresponding to Fig. 3 of a modified form of shoe. Fig. 6 illustrates a protective shoe embodying my invention and adapted to be applied to tires of ordinary forms. Fig. 7 shows a different form of tread for the shoe.

Like characters refer to like parts throughout the several figures of the drawings.

Referring particularly to Fig. 1 I have shown a vehicle wheel of known construction and have designated the same by the character 2. This wheel is provided with a felly as 3 with which a tire such as that denoted in a general way by 4 (see Fig. 2) is connected. The tire 4 includes in its make-up an inner or inflatable tube as 5 and an outer or protective tube as 6, and the latter may be connected with the felly 3 in any desirable way. The periphery of the outer tube 4 is shown as provided with a wide bearing portion 7 to provide an ample bearing surface for the body of the shoe 8 which is made in the form of a band or annulus to wholly surround the outer tube 6, as clearly indicated in Fig. 1. It will be understood, of course, that it is not essential that the tire 4 comprise both inner and outer tubes. Should the tire only involve one tube in its construction it is the function of the shoe 8 to prevent puncture of such tube. In the present case the shoe 8 prevents puncturing of the tube 6 and naturally and more important the same office is performed with respect to the inner or inflatable tube 5. The shoe 8, which may be made from any suitable metal, is provided with inwardly extending circumferentially-separated or spaced lugs as 9 arranged in the present case in opposing pairs and these pairs of lugs 9 are adapted to hug the outer tube 6, as clearly indicated in Fig. 2. The shoe therefore is really channeled on its inner side and the outer tube 6 fits into this channel. The shoe is preferably held in place by the inflation of the inner tube 5. The shoe can be applied to the outer tube when the inner tube is deflated, after which the inner tube will be inflated to hold the shoe in place. By separating the lugs 9 circumferentially of the band or annular strip 8 I provide for the requisite degree of resiliency of the shoe. In addition to the inwardly extending lugs or ears 9, the shoe 8 has also at opposite sides thereof the outwardly extending lugs 10 arranged also in opposing pairs and coincident with the lugs 9 and, like the latter, circumferentially separated or spaced with respect to the shoe or band 8 whereby the necessary resiliency of the said shoe or band will be retained. The presence of these outwardly extending lugs 10 provides a channel upon the outer side of the shoe or band 8, in which the tread portion 11 of the tire can be received, said tread portion being embraced by the respective lugs 10 with a sufficient pressure as to hold said tread portion in place. I prefer, in order to insure a more perfect hold of the lugs 10 on the tread portion 11, that said lugs 10 converge outwardly as clearly shown in Fig. 2. To insure the ready application of the shoe 8 to the outer tube 4 the lugs 9 may diverge inwardly as also shown in said Fig. 2. If desired, the tread portion 11 may be provided with reinforcing means such as wires 12. Said tread portion may be of rubber or other desired material.

In Fig. 5 I have shown a modified form of shoe, the same being denoted by 8' and having only the inwardly extending lugs 9'. This shoe 8' has no outwardly extending lugs as no resilient tread member such as 11 is provided in connection therewith. Instead of this the shoe 8 is provided with rows of prongs as 11' so as to particularly adapt said shoe 8' to a tire used for traveling over icy or muddy surfaces, the shoe 8' by virtue of such prongs 11' obtaining a secure purchase upon such surfaces.

My invention also contemplates the application of a puncture-proof or protective shoe to tires of the ordinary construction, that is to say, it is my purpose to provide a protective shoe that is made separate from the tire and is capable of being interchangeably applied to the peripheries of tires of the ordinary form for the purpose of rendering them puncture-proof and more durable as well as to improve the resilient qualities thereof. An embodiment of this form of the invention is shown in Fig. 6 of the drawing, an ordinary pneumatic tire being shown in that instance embodying an outer tube or casing 14 which may be used either singly or in connection with an inner tube, the periphery of the outer tube or casing being rounded as shown, or it may be provided with a raised tread. In either case, the protective shoe is applied to the tire by the use of an intermediate annular member 15 which is preferably a cushion that may be composed of rubber or other resilient material of annular form to surround the tire; and its inner surface is preferably provided with a transverse radius or channel 16 which conforms substantially to the transverse curvature of the tire, the periphery of the latter lying within the channel thus formed and thereby preventing relative lateral disengagement of the tire and the coöperating cushion. The latter may be readily applied to the tire while the same is deflated, and when the tire is inflated it will be retained within the channel of the cushion as previously described. The shoe 17 in this form of the invention extends circumferentially of the cushion 15 and is centered thereon by the inwardly extending lateral flanges or lugs 18 and 19 which engage at opposite sides thereof, while the out-turned lugs 20 and 21 co-incident with the respective lugs 18 and 19 provide a circumferential channel to receive the tread 22 which is preferably composed of rubber or other resilient material to serve as a cushion; and it may be made in any suitable manner, that shown in Fig. 6 being similar to the form shown in Fig. 2, while that shown in Fig. 7 is composed of a set of annular members 23 arranged in parallel relation between the lateral out-turned lugs of the shoe.

A tire protector constructed in accordance with that form of the invention just described is capable of being interchangeably fitted to tires of the ordinary form, and in practice it lengthens the period of service thereof by rendering it puncture-proof and providing a durable wearing surface therefor, and it improves the resilient qualities of the tire.

What I claim is:

1. The combination with a pneumatic tire having a widened tread portion, of a tire protector in the form of a continuous annular band surrounding the tread portion and formed at its sides with inwardly extending permanently secured lugs, circumferentially separated and having sufficient close association to frictionally engage the tread portion and retain the band thereon without the use of additional positive fastening means.

2. The combination with a pneumatic tire having a widened tread portion, of a band of annular form and of a single integral section of material surrounding said tread portion as a tire protector, said band having integral inwardly extending lugs circumferentially separated and engaging the sides of said tread portion to center and retain the band thereon, said band having integral outwardly projecting lugs circumferentially separated, and an outer tread portion surrounding the band and held between said outwardly projecting lugs.

3. The combination with a pneumatic tire having a widened tread portion, of an annular continuous integral band surrounding said tread portion as a tire protector and formed at its sides with inwardly extending circumferentially separated integral lugs engaging the sides of said tread portion and serving to center said band thereon, and with outwardly extending circumferentially separated integral lugs co-incident with said first named lugs, and an outer tread member surrounding said band and held between said outwardly extending lugs.

4. The combination with a pneumatic tire having a widened tread portion, of a continuous integral annular band surrounding said tread portion as a tire protector and having integral inwardly extending and diverging circumferentially spaced lugs engaging the sides of said tread portion and serving to center said band thereon and having integral outwardly extending and converging circumferentially spaced lugs and an outer tread portion surrounding said band and held between said last named lugs.

5. The combination with a pneumatic tire having a widened tread portion, of a tire protector in the form of a continuous integral annular band surrounding said tread portion and formed at its sides with inwardly extending circumferentially separated divergently related lugs arranged to engage the sides of the tread portion at the center of the band thereon, the said tread portion having a wedge-like engagement between said lugs by reason of pressure when the tire is inflated.

In testimony whereof I have hereunto set my hand in presence of two subscribing witnesses.

THEODORE H. BANKS.

Witnesses:
GEO. STICKNEY,
CHAS. BRADFORD.